(12) United States Patent
Andrews et al.

(10) Patent No.: US 11,645,457 B2
(45) Date of Patent: May 9, 2023

(54) NATURAL LANGUAGE PROCESSING AND DATA SET LINKING

(71) Applicant: Promontory Financial Group, LLC, Washington, DC (US)

(72) Inventors: Joshua N Andrews, Centennial, CO (US); Thomas C Wisehart, Jr., Centennial, CO (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 341 days.

(21) Appl. No.: 15/690,811

(22) Filed: Aug. 30, 2017

(65) Prior Publication Data

US 2019/0065459 A1 Feb. 28, 2019

(51) Int. Cl.
- G06F 40/205 (2020.01)
- G06F 16/9032 (2019.01)
- G06F 40/134 (2020.01)
- G06F 40/279 (2020.01)
- G06F 40/289 (2020.01)
- G06F 40/194 (2020.01)

(52) U.S. Cl.
CPC ...... *G06F 40/205* (2020.01); *G06F 16/90332* (2019.01); *G06F 40/134* (2020.01); *G06F 40/279* (2020.01); *G06F 40/289* (2020.01); *G06F 40/194* (2020.01)

(58) Field of Classification Search
CPC ............ G06F 17/2705; G06F 17/2235; G06F 17/2775; G06F 16/90332; G06F 17/2765; G06F 17/2211

USPC .......................................................... 704/9
See application file for complete search history.

(56) References Cited

U.S. PATENT DOCUMENTS

| | | | |
|---|---|---|---|
| 8,166,001 B1 | 4/2012 | Grieves et al. | |
| 2009/0164499 A1* | 6/2009 | Samudrala | ............ G06F 21/604 |
| 2009/0241165 A1 | 9/2009 | Tyree et al. | |
| 2017/0004204 A1* | 1/2017 | Bastide | ............... G06F 16/3329 |
| 2017/0068720 A1* | 3/2017 | Ko | ..................... G06F 16/24575 |
| 2017/0091320 A1* | 3/2017 | Psota | .................. G06F 16/3337 |

OTHER PUBLICATIONS

S. Sunkle, D. Kholkar and V. Kulkarni, "Informed Active Learning to Aid Domain Experts in Modeling Compliance," 2016 IEEE 20th International Enterprise Distributed Object Computing Conference (EDOC), 2016, pp. 1-10, doi: 10.1109/EDOC.2016.7579382. (Year: 2016).*

(Continued)

*Primary Examiner* — Bharatkumar S Shah
(74) *Attorney, Agent, or Firm* — Cuenot, Forsythe & Kim, LLC (57) ABSTRACT

A method in a data processing system comprising a processor and a memory, for processing data entries, the method comprising receiving, by the data processing system, a data entry, parsing, by the data processing system, the data entry for features by using natural language processing (NLP), identifying, by the data processing system, data sets from a corpus of information that are relevant to the data entry, and linking, by the data processing system, the identified data sets to the data entry.

25 Claims, 6 Drawing Sheets

(56) References Cited

OTHER PUBLICATIONS

S. Sunkle, D. Kholkar and V. Kulkarni, "Informed Active Learning to Aid Domain Experts in Modeling Compliance," 2016 IEEE 20th International Enterprise Distributed Object Computing Conference (EDOC), 2016, pp. 1-10, doi: 10.1109/EDOC.2016.7579382. (Year: 2016) (Year: 2016).*

P. Anthonysamy, A. Rashid and R. Chitchyan, "Privacy Requirements: Present & Future," 2017 IEEE/ACM 39th International Conference on Software Engineering: Software Engineering in Society Track (ICSE-SEIS), Bueons Aires, Argentina, 2017, pp. 13-22, doi: 10.1109/ICSE-SEIS.2017.3. (Year: 2017).*

* cited by examiner

NATURAL LANGUAGE PROCESSING AND DATA SET LINKING

BACKGROUND

The present invention generally relates to database management, and in particular, natural language processing of data entries to establish links to relevant data sets.

Natural language processing ("NLP") is a field of computer science, artificial intelligence, and linguistics concerned with the interactions between computers and human (natural) languages. Many challenges in NLP involve natural language understanding, e.g., enabling computers to derive meaning from human or natural language input. Understanding human language includes understanding not only the words, but also the concepts. In certain instances, a determination of the originality of the concepts and whether the concepts have been cited from other information sources may be desired.

SUMMARY

A method, computer systems, and computer program products are disclosed. According to one embodiment, said method is for processing data entries in a data processing system comprising a processor and a memory. Said method comprises receiving, by said data processing system, a data entry. Said data entry is parsed by said data processing system for features by using natural language processing (NLP). Said data sets are identified, by said data processing system, from a corpus of information that are relevant to said data entry. Said method further comprises linking, by said data processing system, said identified data sets to said data entry.

Said data entry may comprise a data structure that includes text, characters, and numbers that are arranged in expressions selected from said group consisting of: terms, acronyms, numbers, codes, and phrases. Said data entry may also comprise model rules that are related to data sets including regulations, policies, obligations, or guidance from said corpus of information. According to one embodiment, receiving said data entry further comprises receiving, by said data processing system, a selection of data from a local or remote database. In another embodiment, receiving said data entry further comprises receiving, by said data processing system, a manual data entry from a client device.

Parsing said data entry may further comprise decomposing, by said data processing system, said data entry into text fragments, comparing, by said data processing system, said text fragments to said corpus of information, identifying, by said data processing system, said features based on said comparison, and assigning, by said data processing system, scores to said text fragments, wherein said scores are indicative of a degree to which said identified features of said text fragments match one or more data sets from said corpus of information. Identifying data sets from a corpus of information that are relevant to said data entry may further comprise identifying said data sets based on said scores of said text fragments. Linking said identified data sets to said data entry may further comprise adding one or more links to said data entry. Parsing said data entry may further comprises identifying elements in said data entry that are semantically or logically related to said data sets.

According to one embodiment, said computer system comprises a computer processor, a computer memory operatively coupled to said computer processor and said computer memory having disposed within it computer program instructions. Said computer program instructions, when executed by said processor, cause said computer system to receive a data entry from a database. Said computer program instructions also cause said computer system to parse said data entry for features by using natural language processing (NLP). Said computer program instructions further cause said computer system to identify data sets from a corpus of information that are relevant to said data entry. Said computer program instructions also cause said computer system to link said identified data sets to said data entry. Said computer program instructions also cause said computer system to detect a change to said identified data sets. Said computer program instructions further cause said computer system to indicate said change to said identified data set in said data entry.

In yet another embodiment, said computer system is for generating data entries and comprises a computer processor, a computer memory operatively coupled to said computer processor. Said computer memory having disposed within it computer program instructions that, when executed by said processor, cause said computer system to identify features of one or more data sets from a corpus of information. Said computer program instructions also causes said computer system to cluster said one or more data sets based on said identified features. Said computer program instructions also causes said computer system to generate one or more data entries from said clustered data sets. Said computer program instructions also causes said computer system to request review of said one or more generated data entries. Said computer program instructions also causes said computer system to receive said review of said one or more generated data entries. Said computer program instructions further causes said computer system to store said one or more generated data entries in a files database based on said review.

Identifying the features of the one or more data sets may further comprise the computer system identifying given terms or phrases from structured and unstructured data. In another embodiment identifying the features of the one or more data sets may further comprise the computer system analyzing metadata and tags associated with the one or more data sets, where the metadata and tags include representations of the features of the one or more data sets. Clustering the one or more data sets may further comprise the computer system clustering the one or more data sets according to a degree of similarity of the identified features. In another embodiment, clustering the one or more data sets may further comprise the computer system generating clusters of the one or more data sets. Said one or more generated data entries can be representative of the generated clusters.

Receiving the review of the one or more generated data entries may further comprise the computer system receiving acceptance of the one or more generated data entries. Additionally, receiving the review of the one or more generated data entries may further comprise the computer system receiving edited versions of the one or more generated data entries. Said computer program instructions also causes said computer system to store the edited versions of the one or more generated data entries in the files database.

According to one embodiment said computer program product is for processing data entries. Said computer program product comprises a computer readable storage medium having stored thereon program instructions executable by a processor to cause said processor to receive a data entry. Said computer readable storage medium also stores program instructions executable by a processor to cause said processor to parse said data entry for features by using natural language processing (NLP). Said computer readable storage medium further stores program instructions executable by a processor to cause said processor to identify data sets from a corpus of information that are relevant to said data entry.

Said computer readable storage medium may also store program instructions executable by said processor to cause said processor to link said identified data sets to said data entry. Said data entry may comprise model rules that are related to data sets including regulations, policies, obligations, or guidance from said corpus of information. Said computer readable storage medium also stores program instructions executable by the computer to cause the computer to receive a selection of data from a local or remote database. Said computer readable storage medium may also store program instructions executable by the computer to cause the computer to receive a manual data entry from a client device. Said computer readable storage medium also stores program instructions executable by the computer to cause the computer to decompose the data entry into text fragments, compare the text fragments to the corpus of information, identify the features based on the comparison, and assign scores to the text fragments, wherein the scores are indicative of a degree to which the identified features of the text fragments match one or more data sets from the corpus of information.

In another embodiment, said computer program product comprises a computer readable storage medium having stored thereon program instructions executable by a processor to cause the processor to receive a data entry from a database. Said computer readable storage medium also stores program instructions executable by the processor to cause the processor to parse the data entry for features by using NLP. Said computer readable storage medium also stores program instructions executable by the processor to cause the processor to identify data sets from a corpus of information that are relevant to the data entry. Said computer readable storage medium also stores program instructions executable by the processor to cause the processor to link the identified data sets to the data entry. Said computer readable storage medium also stores program instructions executable by the processor to cause the processor to detect a change to the identified data sets. Said computer readable storage medium further stores program instructions executable by the processor to cause the processor to indicate the change to the identified data set in the data entry.

DETAILED DESCRIPTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Exemplary methods, computer systems, and products for processing data entries and data sets using natural language processing ("NLP") in accordance with the present invention are described with reference to the accompanying drawings. NLP can be used to analyze text in combination with machine-learning to facilitate understanding of human languages by a computer. Computers may utilize NLP in a variety of real-world applications, such as, machine translation, information extraction, automatic text summarization, sentiment analysis, word filtering, automated question answering, etc. According to at least one embodiment of the present invention, NLP may be used to analyze a data entry to identify unique concepts, and link data sets that correspond to the unique concepts to the data entry. For example, a given data entry may comprise user-created content comprising a model rule where the model rule includes data from one or more regulations, policies, obligations, guidance, etc., that are contained in one or more data sets. As such, links to the one or more data sets may be established with the given data entry.

Figure 1:
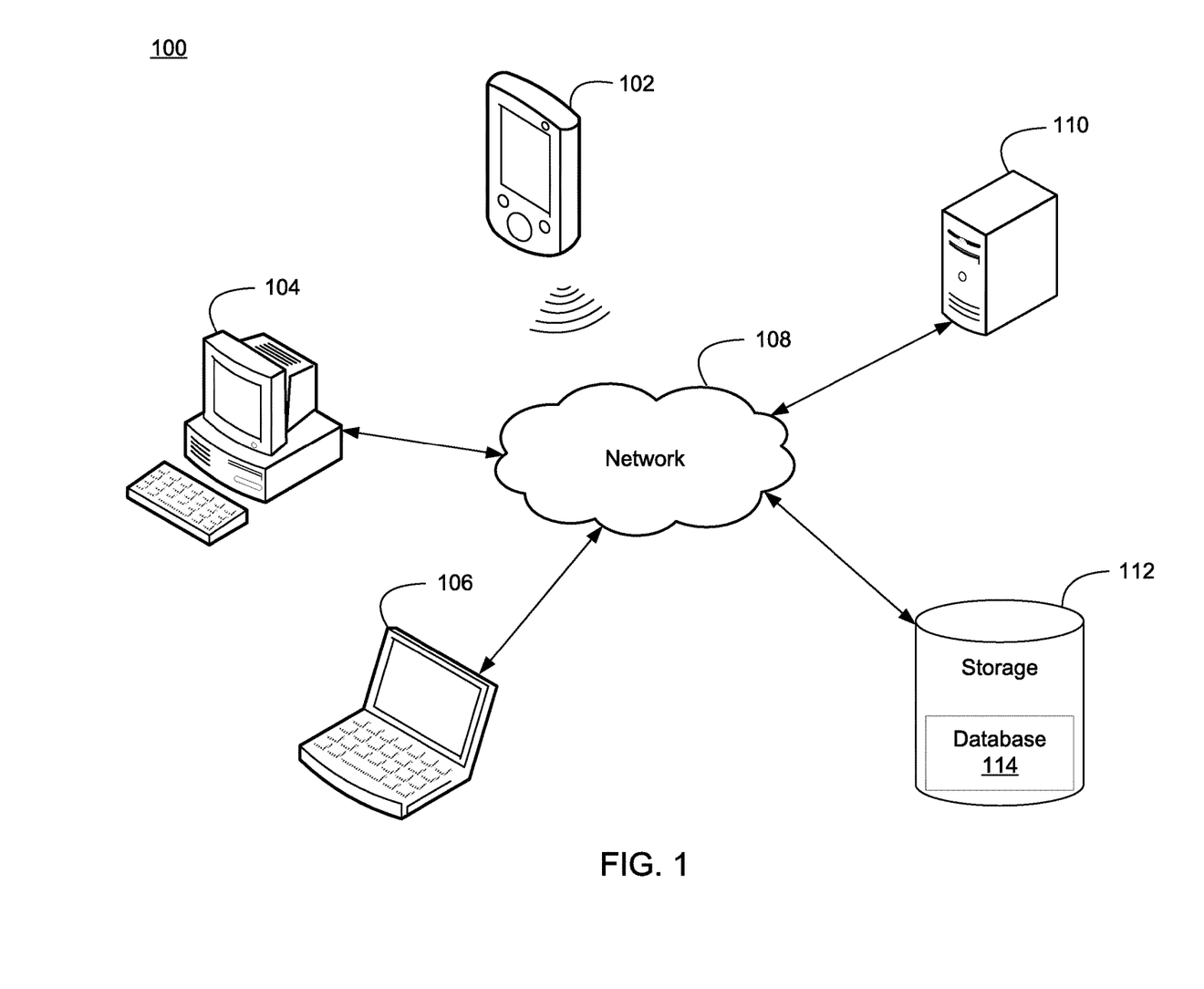
FIG. 1 illustrates a computing environment according to an embodiment of the present invention.

Referring now to FIG. 1, illustrative computing environment 100 is depicted. As shown, computing environment 100 includes one or more computing devices, such as, for example, personal digital assistant (PDA) or cellular telephone 102, desktop computer 104, and/or laptop computer 106. Any of the computing devices may communicate with a server 110 and storage 112 over network 108 using wired or wireless communication technologies. Server 110 is operative to receive requests from the computing device, retrieve data from database 114 (stored in storage 112), and process the requests and the retrieved data to generate responses to the computing devices across the network 108. Servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. It is understood that the types of computing devices shown in FIG. 1 are intended to be illustrative only and that any type of computerized device can communicate with server 110 over any type of network and/or network addressable connection (e.g., using a web browser).

Network 108 may be any suitable type of network allowing transport of data communications across thereof. Network 108 may support many data communications protocols, including for example TCP (Transmission Control Protocol), IP (Internet Protocol), HTTP (Hypertext Transfer Protocol), WAP (Wireless Access Protocol), HDTP (Handheld Device Transport Protocol), and others as will occur to those of skill in the art. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client devices and servers may be encrypted using, for example, the Advanced Encryption Standard (AES) with a 128, 192, or 256-bit key size, or any other encryption standard known in the art.

Figure 2:
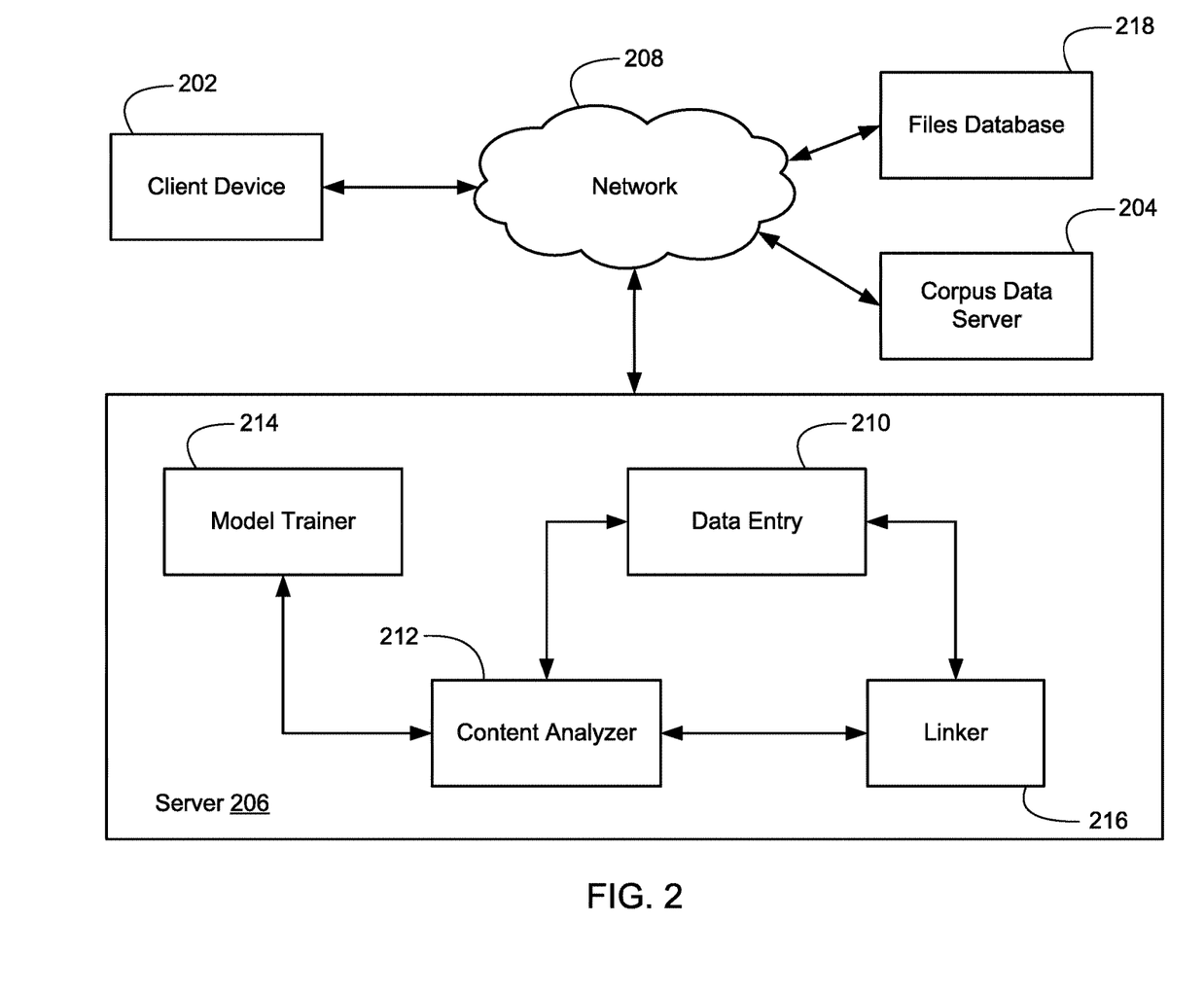
FIG. 2 illustrates a logical block diagram of a system for processing data entries according to one embodiment of the present invention.

FIG. 2 presents a logical block diagram of a data processing system for natural language processing of data entries according to one embodiment of the present invention. The present invention is not limited to the arrangement of devices in the exemplary system illustrated in FIG. 2, but rather are for explanation. Data processing systems useful according to various embodiments of the present invention may include additional servers, routers, other devices, and peer-to-peer architectures, not shown in FIG. 2, as understood by those of skill in the art.

The illustrated system includes client device 202 and corpus data server 204 communicatively coupled to server 206 via a network 208. Client device 202 may comprise computing devices (e.g., desktop computers, terminals, laptops, personal digital assistants (PDA), cellular phones, smartphones, tablet computers, or any computing device having a central processing unit and memory unit capable of connecting to a network). Client devices may also comprise a graphical user interface (GUI) or a browser application provided on a display (e.g., monitor screen, LCD or LED display, projector, etc.). A client device may include or execute a variety of operating systems, such as personal computer operating systems (e.g., Windows, Mac OS or Linux, etc.), mobile operating systems (e.g., iOS, Android, or Windows Mobile, etc.), or the like. A client device may include or may execute a variety of possible applications, such as a client software application enabling communication with other devices, such as communicating one or more messages, such as via email, short message service (SMS), or multimedia message service (MMS).

The system further includes automated computing machinery comprising the server 206 useful in NLP according to embodiments of the present invention. The server includes at least one computer processor or "CPU" as well as random access memory ("RAM") which is connected through a high-speed memory bus and bus adapter to the processor and to other components of the server. Stored in RAM, or a hard drive connected to the RAM, may be a content analyzer 212 including computer program instructions that when executed, cause the computer to perform parsing of data in data entry 210 using NLP to identify and create associations between the data entry 210 and one or more data sets from corpus data server 204. Stored in RAM also is an operating system. Operating systems useful for NLP according to embodiments of the present invention include UNIX™ Linux™ Microsoft Windows™ AIX™ IBM's i5/OS™ and others as will occur to those of skill in the art. Non-volatile computer memory also may be implemented for such as an optical disk drive, electrically erasable programmable read-only memory (so-called 'EEPROM' or 'Flash' memory), RAM drives, and so on, as will occur to those of skill in the art.

According to one embodiment, client device 202 may provide data to data entry 210. The provided data may comprise a data structure that includes a collection or combination of text, characters, and numbers that are expressed in terms, acronyms, numbers, codes, or phrases, and so on. Client device 202, server 206, and corpus data server 204 may also be communicatively coupled to files database 218. Files database 218 may comprise a local or remote storage device that stores user- or machine-generated data (e.g., model rules) capable of being selected, retrieved, and forwarded to data entry 210. Content of the data may either be manually entered on the client device 202, retrieved from files database 218, or a combination thereof.

Content analyzer 212 can be configured to parse the elements in data entry 210 to determine its features. The one or more data sets may comprise structured and unstructured data including text, characters, and numbers in, for example, files, documents, tables, charts, illustrations, photographs, etc. An example of data sets may include policies, regulations, obligation, guidance, and procedures of which an organization is reliant upon. The content analyzer 212 may comprise an artificial intelligence unit trained by model trainer 214 (e.g., using machine learning techniques such as neural networks) to identify features by determining elements, such as, text, terms, and phrases, of data entry 210 that are semantically and/or logically related to content of one or more data sets from corpus data server 204. Corpus data server 204 may comprise one or more computing devices, either local or remote, that are operable to provide the one or more data sets.

Identifying elements in the data entry 210 that are semantically and/or logically related to the one or more data sets may be based on criteria generated from training of model trainer 214. Features of the data entry 210 may be compared to the criteria by content analyzer 212 to determine whether the features of the data match the content contained in one or more data sets from corpus data server 204. The data may comprise elements against which the criteria may be measured or otherwise compared. The criteria may include, for example, topics, subject matter, target audiences, use of phrases, terms, and codes, etc., that correspond to the one or more data sets. Training data for model trainer 214 may be received from various sources and in various ways, including, for example, from a user through a graphical user interface ("GUI") presented on the display of the client device 202 and from corpus data server 204.

Linker 216 is operable to link (or reference, map, embed, tag, etc.) specific data sets in corpus data server 104 to the data in data entry 210 and/or in files database 218 based on matching of the criteria. According to one embodiment, links may be placed in or associated with certain portions of the data. The linker 216 can also be used to establish a bidirectional association between the data and the one or more data sets from corpus data server 204. That is, if the one or more data sets from corpus data server 204 are updated, removed, or otherwise changed and are linked to data objects in files database 218, linker 216 may detect, identify and indicate/signal (e.g., highlight or flag), for review, specific data or portions of the data objects in database 218 that are affected by the update of the one or more data sets. For example, the identification of changed data via linker 216 may be presented when corresponding data in files database 218 are retrieved or accessed by a client device.

Figure 3:
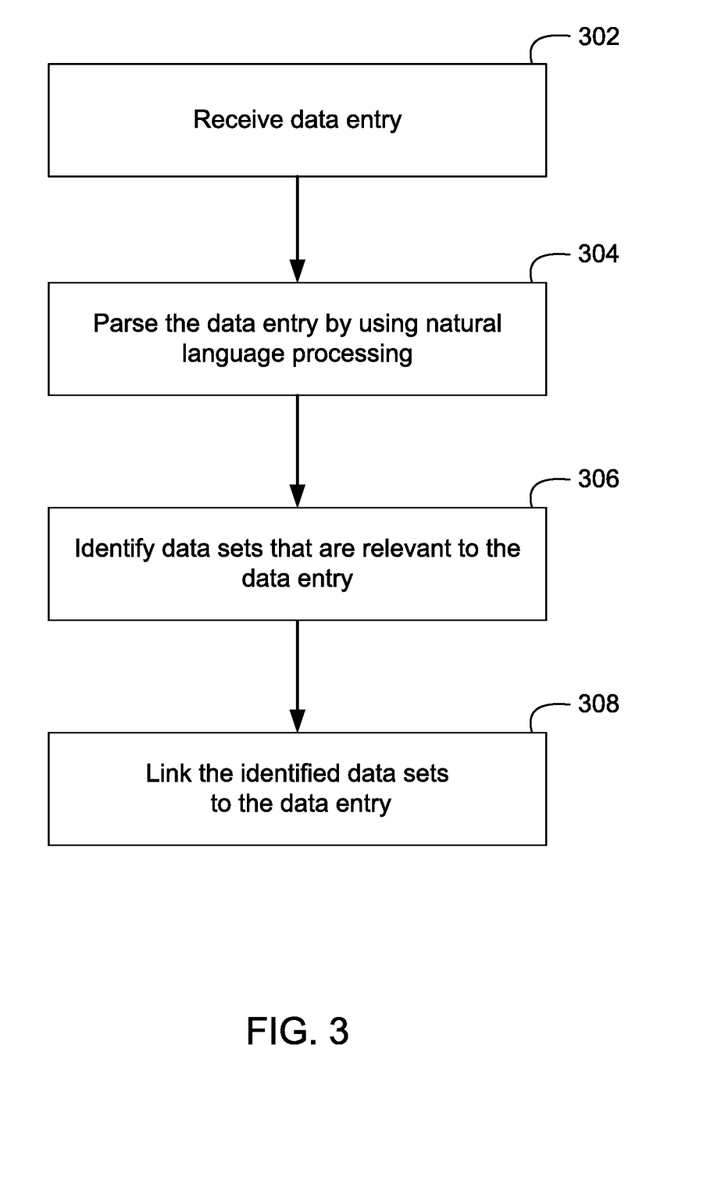
FIG. 3 illustrates a flowchart of a method for processing data entries according to an embodiment of the present invention.

FIG. 3 presents a flowchart of a method for processing data entries according to an embodiment of the present invention. A data entry is received, step 302. The data entry may include a collection of user-generated content containing text, language, content, etc., that is related to, based on, or cited from various data sets and/or information sources. For example, the data entry may comprise model rules of compliance that are commonly prepared by subject matter experts in the regulatory industry. The data entry may include a set of data or a body of text and characters that can be selected from or retrieved from a local or remote database. Additionally, the data entry may comprise a manual data entry provided from a client device using an input device.

The data entry is parsed by using natural language processing, step 304. In particular, the data entry may be parsed by a content analyzer for specific features within the body of information. The NLP may be configured to identify features and concepts, label, or otherwise classify the content of the data entry. According to one embodiment, the content analyzer may use NLP to identify specific features in the data entry that are based on, for example, a reference corpus of information. That is, the content analyzer may be trained by associating text or words from the reference corpus with specific labels.

NLP processing may include decomposing the data entry into text fragments by grouping text segments based on logical operators, formatting codes (e.g., paragraph markers, font styles, indentions, tabs and the like), as well as the use of punctuation (e.g., periods, commas, hyphens, semicolons, colons, and the like). Thereafter, the text fragments may be compared to the content or an index of a plurality of data sets from a reference corpus of information. The index may indicate, for example, topics, topic types, target audiences, degrees of importance, etc., for a plurality of data sets within the corpus. In another embodiment, the text fragments may be compared with tags or metadata associated with the data sets of the corpus. For example, the data sets in the corpus of information may be categorized, organized, or indexed according to specific topics or information. Features of the text fragments may be identified based on the comparison with the index, tags, or metadata of the corpus. Scores can be assigned to the text fragments based on an evaluation of the text fragments matching one or more data sets. The scores may comprise a value that indicates a degree to which the identified features of the text fragments match one or more data sets.

Data sets from the corpus of information that are relevant to the data entry are identified, step 306. Referring back to the previous example, organizations may seek the reason as to why certain model rules are needed and their basis of support from sources of obligation and procedure data. Accordingly, the content analyzer can identify content in the model rules pertaining to a set of regulations, policies, obligations, and guidance that that may be found in data sets from one or more corpus data server(s). For example, the data sets may include compliance obligations including laws, regulations, contractual commitments, organizational and industry standards, codes or practice, ethical codes of conduct, good governance guidelines, and agreements with community groups or non-governmental organizations. Identifying the relevant data sets may be based on the scoring of the text fragments. For example, a given text fragment having a score value that exceeds a predetermined threshold for one or more given data sets may indicate that the one or more given data sets are relevant to the given text fragment.

The identified data sets are linked to the data entry, step 308. Links may be generated between one or more identified data sets from the corpus of information to the data entry. The identified data sets may be linked to the data entry via references or pointers. According to one embodiment, links may be added to the content of the data entry. The links are able to establish a connection for data sets that correspond to NPL-identified concepts of the data entry.

Figure 4:
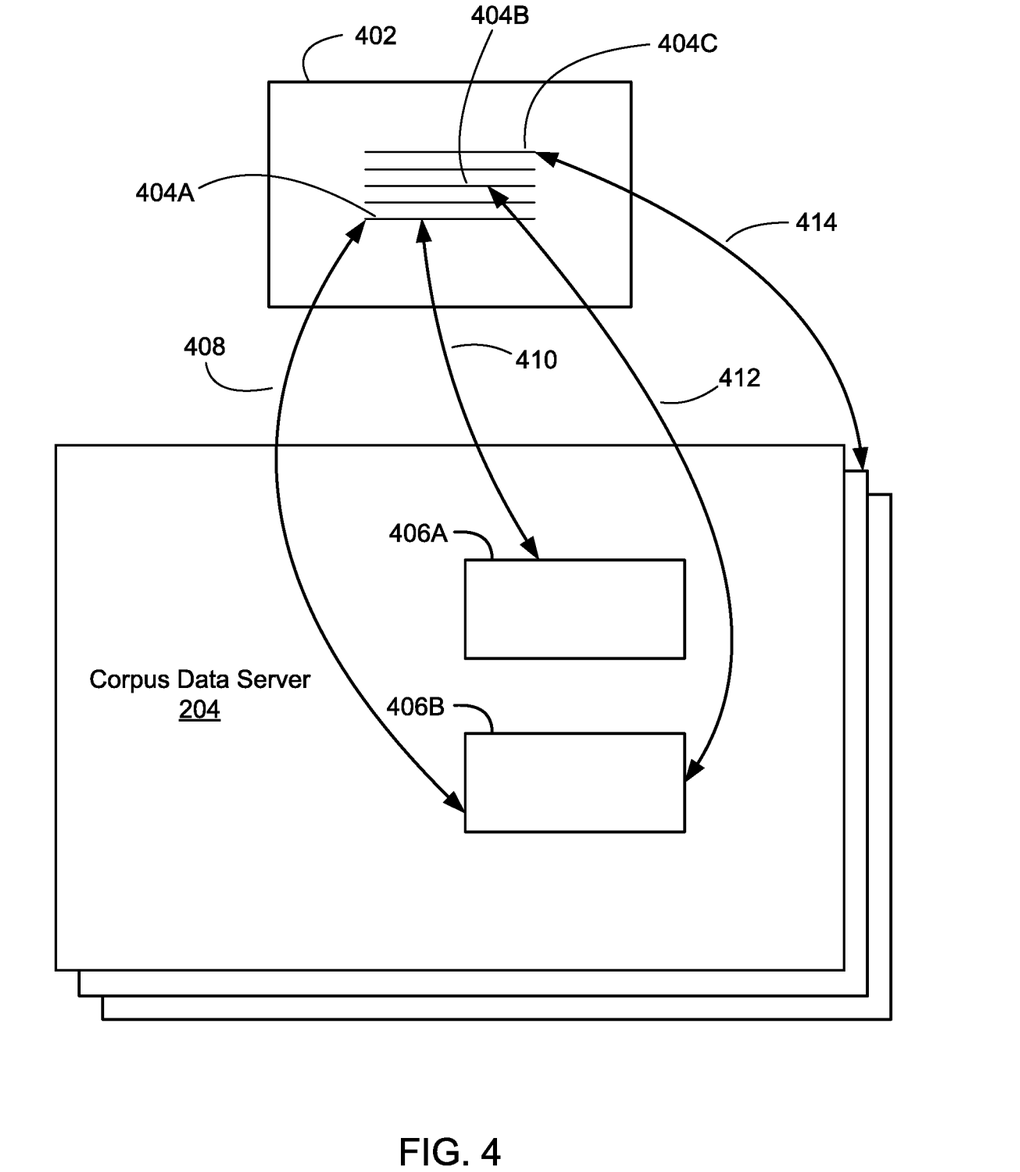
FIG. 4 illustrates a data mapping diagram according to an embodiment of the present invention.

FIG. 4 presents a data mapping diagram according to an embodiment of the present invention. Data entry 402 includes text fragment 404A, text fragment 404B, and text fragment 404C. The text fragments may comprise artificial divisions of data entry 402 by means of NLP, as disclosed above. Corpus data 204 includes data set 406A and 406B. One or more data sets in corpus data server 204 may be linked to a given text fragment. Links 408, 410, 412, and 414 may be created to associate the data sets with data entry 402. Data set 406B is linked to text fragment 404A via link 408, data set 406A is linked to text fragment 404A via link 410, and data set 406B link to text fragment 404B via 412. Additionally, link 414 may be created to link a data set from another corpus data server to text fragment 404C.

Figure 5:
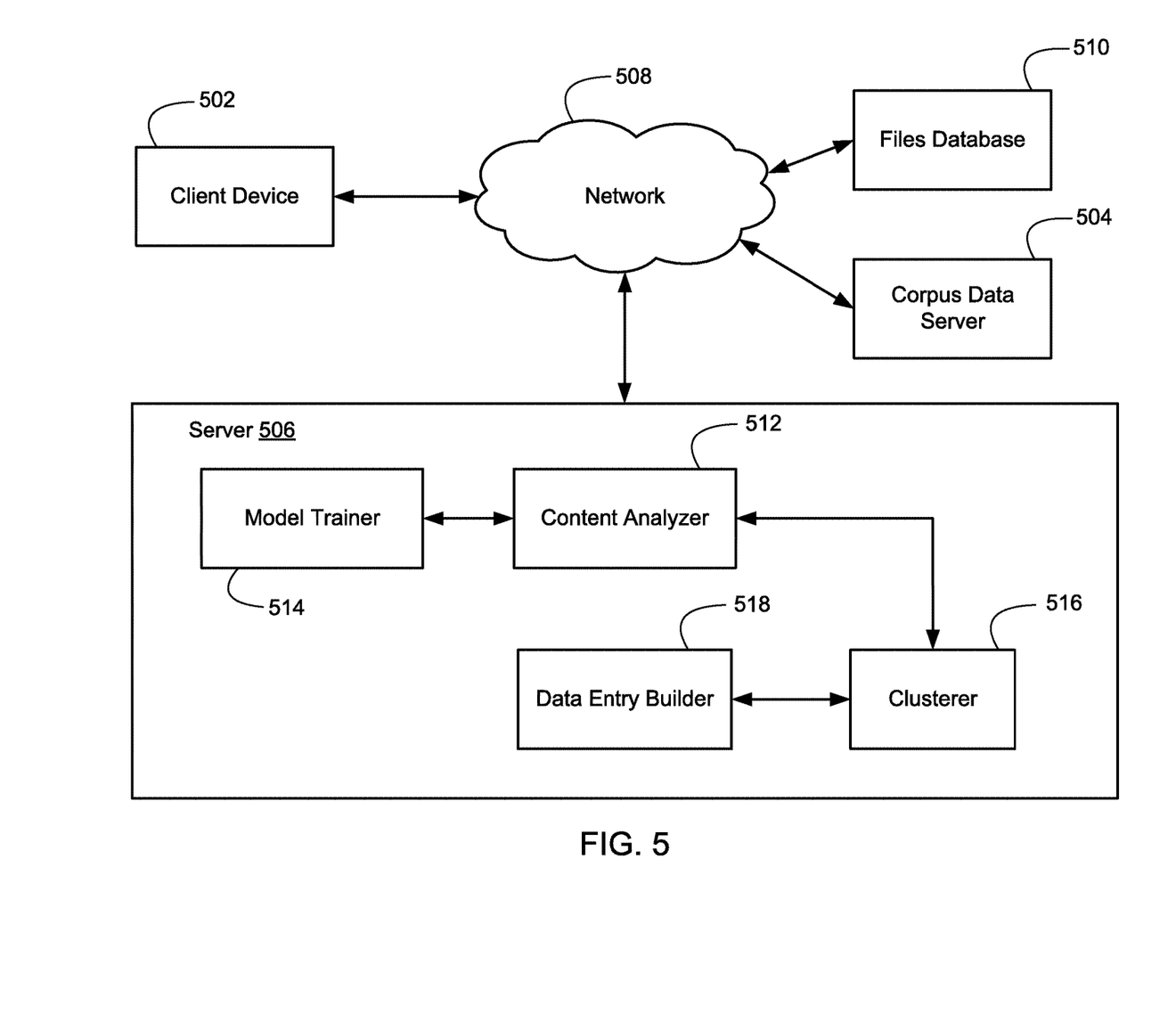
FIG. 5 illustrates a logical block diagram of a system for generating data entries according to another embodiment of the present invention.

FIG. 5 presents a logical block diagram of a system for generating data entries according to another embodiment of the present invention. The illustrated system includes client device 502, corpus data server 504, server 506, and files database 510 that are communicatively coupled via a network 508. Server 506 includes at least one computer processor or CPU as well as RAM which is connected through a high-speed memory bus and bus adapter to the processor and to other components of the server. Stored in RAM, or a hard drive connected to the RAM, may be a content analyzer 512 including computer program instructions that when executed, cause the computer to perform analysis of the content of the data sets in corpus data server 504 to identify features from the content. In one embodiment, content analyzer 512 may parse the data sets through MLP to determine their features. Alternatively, or in combination with NLP, content analyzer 512 may analyze metadata or tags found in corpus data server 504 that are representative of the content and features contained in the data sets.

According to one embodiment, corpus data server 504 may comprise one or more computing devices, either local or remote, that are operable to provide one or more data sets comprising structured and unstructured data in, for example, files, documents, tables, charts, illustrations, photographs, etc., and the structured and unstructured data further includes text, characters, and numbers. The content analyzer 512 may comprise an artificial intelligence unit trained by model trainer 514 (e.g., using machine learning techniques such as neural networks) to identify features from elements, such as, terms and phrases, of the data sets of corpus data server 504. Clusterer 516 may perform clustering of the data sets or generate clusters from the data sets based on the features identified by content analyzer 512. Data sets that share a degree of similarity in features may be grouped according to clustering techniques (e.g., connectivity-based clustering, centroid-based clustering, etc.).

Based on the clustering, data entry builder 518 may machine-generate data entries (e.g., model rules) that are representative of the clusters of data sets. The generated data entries can be forwarded to client device 502 for review. A user of client device 502 may accept, submit edited versions of the generated data entries, or reject the generated data entries. Generated data entries that have been accepted may be stored to files database 510 while the rejected data entries may be discarded or archived for subsequent retrieval. Files database 510 may comprise a local or remote storage device that is capable of storing user- or machine-generated data entries.

Figure 6:
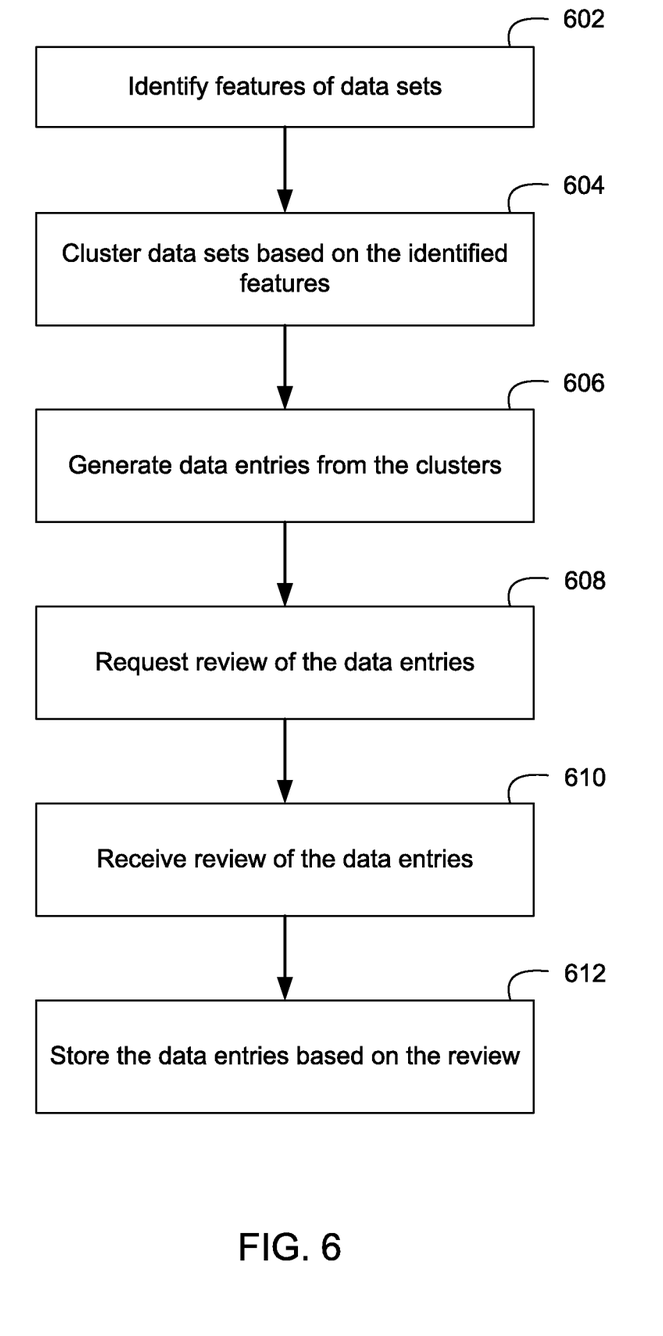
FIG. 6 illustrates a flowchart of a method for generating data entries according to an embodiment of the present invention.

FIG. 6 illustrates a flowchart of a method for generating data entries according to an embodiment of the present invention. Features of one or more data sets are identified, step 602. The data sets may comprise structured and unstructured data including text, characters, and numbers in the form of, for example, files, documents, tables, charts, illustrations, photographs, etc. The structured and unstructured data may be parsed through natural language processing to determine their features (e.g., certain terms or phrases). Alternatively, metadata or tags associated with the data sets and representative of the content and features contained in the data sets may be analyze to determine features.

The data sets are clustered based on the identified features, step 604. Features identified from the data sets may be used to cluster the data sets according to a degree of similarity in their features. For example, data sets with features that indicate a same or related policies may be formed into a cluster. Clustering includes grouping a set of objects in such a way that objects in the same group are more similar to each other than to those in other groups. Clustering may further examine logical and semantic relationships between the content of the data sets. Clusterings may be either hard clustering (e.g., an object belongs to a cluster or not) or soft clustering (e.g., an object belongs to a cluster to a certain degree or the likelihood of the object that belongs to the cluster).

Data entries are generated from the clusters, step 606. Machine-generated data entries that are representative of the clusters may be generated. Review of the generated data entries is requested, step 608. The machine-generated data entries may allow, for example, a user to consider whether an organization needs to adopt plans based on the generated data entries. For example, the generated data entries can be forwarded to a client device for review. Review of the generated data entries is received, step 610. The review may include a user accepting the generated data entries for storage in a database, editing the generated data entries for storage in a database, or rejecting the generated data entries. The data entries are stored based on the review, step 612. For example, data entries that have been accepted can be stored to a database of user-created or machine-generated data entries (e.g., model rules) while rejected data entries may be discarded or temporarily stored for subsequent retrieval.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1 through 6 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for processing data entries, comprising:
    receiving, by the data processing system, a data entry containing model rules for compliance;
    parsing, by the data processing system and using natural language process (NLP), the data entry for features;
    identifying, by the data processing system, data sets pertaining to compliance obligations that are relevant to one of the parsed features from the data entry;
    generating, within the data entry and for each of the parsed features, a bidirectional link from the parsed feature to one of the identified data sets pertaining to the compliance obligations that is relevant to the parsed feature;
    detecting a change to the one of the identified data sets; and
    modifying, based upon the detecting the change, the data entry to indicate the one of the identified data sets has been changed.

2. The method of claim 1 wherein
the model rules are a data structure that includes text, characters, and numbers that are arranged in expressions selected from the group consisting of:
terms, acronyms, numbers, codes, and phrases.

3. The method of claim 1 wherein
the data entry is selected from a local or remote database.

4. The method of claim 1 wherein
the data entry is received by a manual data entry from a client device.

5. The method of claim 1 wherein
the parsing the data entry includes:
    decomposing, by the data processing system, the data entry into text fragments;
    comparing, by the data processing system, the text fragments to a corpus of information;
    identifying, by the data processing system, the features based on the comparison; and
    assigning, by the data processing system, scores to the text fragments, and
the scores are indicative of a degree to which the identified features of the text fragments match one or more data sets from the corpus of information.

6. The method of claim 5 wherein
the identifying the data sets includes identifying the data sets based on the scores of the text fragments.

7. The method of claim 1 wherein
the parsing the data entry includes identifying elements in the data entry that are semantically or logically related to the data sets.

8. The method of claim 1, wherein
the identified features are identified by identifying given terms or phrases from structured and unstructured data.

9. The method computer system of claim 1, wherein
the identified features are identified by analyzing metadata and tags associated with the data sets, the metadata and tags including representations of the features of the data sets.

10. A data processing system, comprising
a hardware processor configured to initiate the following executable operations:
  receiving, by the data processing system, a data entry containing model rules for compliance;
  parsing, by the data processing system and using natural language process (NLP), the data entry for features;
  identifying, by the data processing system, data sets pertaining to compliance obligations that are relevant to one of the parsed features from the data entry;
  generating, within the data entry and for each of the parsed features, a bidirectional link from the parsed feature to one of the identified data sets pertaining to the compliance obligations that is relevant to the parsed feature;
  detecting a change to the one of the identified data sets; and
  modifying, based upon the detecting the change, the data entry to indicate the one of the identified data sets has been changed.

11. The system of claim 10, wherein
the model rules are a data structure that includes text, characters, and numbers that are arranged in expressions selected from the group consisting of:
terms, acronyms, numbers, codes, and phrases.

12. The system of claim 10, wherein
the data entry is selected from a local or remote database.

13. The system of claim 10, wherein
the data entry is received by a manual data entry from a client device.

14. The system of claim 10, wherein
the parsing the data entry includes:
  decomposing, by the data processing system, the data entry into text fragments;
  comparing, by the data processing system, the text fragments to a corpus of information;
  identifying, by the data processing system, the features based on the comparison; and
  assigning, by the data processing system, scores to the text fragments, and
the scores are indicative of a degree to which the identified features of the text fragments match one or more data sets from the corpus of information.

15. The system of claim 14, wherein
the identifying the data sets includes identifying the data sets based on the scores of the text fragments.

16. The system of claim 10, wherein
the parsing the data entry includes identifying elements in the data entry that are semantically or logically related to the data sets.

17. The system of claim 10, wherein
the identified features are identified by identifying given terms or phrases from structured and unstructured data.

18. The system of claim 10, wherein
the identified features are identified by analyzing metadata and tags associated with the data sets, the metadata and tags including representations of the features of the data sets.

19. A computer program product, comprising
a computer readable storage medium having program instructions stored therein,
the program instructions, which when executed by a data processing system, cause the data processing system to perform:
  receiving, by the data processing system, a data entry containing model rules for compliance;
  parsing, by the data processing system and using natural language process (NLP), the data entry for features;
  identifying, by the data processing system, data sets pertaining to compliance obligations that are relevant to one of the parsed features from the data entry;
  generating, within the data entry and for each of the parsed features, a bidirectional link from the parsed feature to one of the identified data sets pertaining to the compliance obligations that is relevant to the parsed feature;
  detecting a change to the one of the identified data sets; and
  modifying, based upon the detecting the change, the data entry to indicate the one of the identified data sets has been changed.

20. The computer program product of claim 19, wherein
the model rules are a data structure that includes text, characters, and numbers that are arranged in expressions selected from the group consisting of:
terms, acronyms, numbers, codes, and phrases.

21. The computer program product of claim 19, wherein
the data entry is selected from a local or remote database.

22. The computer program product of claim 19, wherein
the data entry is received by a manual data entry from a client device.

23. The computer program product of claim 19, wherein
the parsing the data entry includes:
  decomposing, by the data processing system, the data entry into text fragments;
  comparing, by the data processing system, the text fragments to a corpus of information;
  identifying, by the data processing system, the features based on the comparison; and
  assigning, by the data processing system, scores to the text fragments, and
the scores are indicative of a degree to which the identified features of the text fragments match one or more data sets from the corpus of information.

24. The computer program product of claim 19, wherein
the parsing the data entry includes identifying elements in the data entry that are semantically or logically related to the data sets.

25. The computer program product of claim 19, wherein
the identified features are identified by identifying given terms or phrases from structured and unstructured data.

* * * * *